United States Patent
Satish et al.

(10) Patent No.: US 10,365,827 B1
(45) Date of Patent: Jul. 30, 2019

(54) SPREAD SPACE TRACKING

(71) Applicant: Pavilion Data Systems, Inc., San Jose, CA (US)

(72) Inventors: Venkeepuram R. Satish, Fremont, CA (US); Muthukumar Ratty, Santa Clara, CA (US); Kiron Balkrishna Malwankar, Saratoga, CA (US)

(73) Assignee: Pavilion Data Systems, Inc., San Jose, CA (US)

( * ) Notice: Subject to any disclaimer, the term of this patent is extended or adjusted under 35 U.S.C. 154(b) by 272 days.

(21) Appl. No.: 15/403,011

(22) Filed: Jan. 10, 2017

(51) Int. Cl.
*G06F 12/02* (2006.01)
*G06F 12/10* (2016.01)
*G06F 3/06* (2006.01)
*G06F 12/1072* (2016.01)

(52) U.S. Cl.
CPC ............ *G06F 3/0608* (2013.01); *G06F 3/067* (2013.01); *G06F 3/0631* (2013.01); *G06F 12/1072* (2013.01); *G06F 2212/1044* (2013.01); *G06F 2212/152* (2013.01); *G06F 2212/154* (2013.01); *G06F 2212/263* (2013.01)

(58) Field of Classification Search
CPC ...... G06F 3/0608; G06F 3/0631; G06F 3/067; G06F 12/1072; G06F 2212/1044; G06F 2212/152; G06F 2212/154; G06F 2212/263
See application file for complete search history.

(56) References Cited

U.S. PATENT DOCUMENTS 7,200,715 B2 * 4/2007 Kleiman ............... G06F 3/0613
711/111

* cited by examiner

*Primary Examiner* — Reginald G Bragdon
*Assistant Examiner* — Hannah A Faye
(74) *Attorney, Agent, or Firm* — Lowenstein Sandler LLP

(57) ABSTRACT

A processing device of a storage server that manages a plurality of physical storage devices arranged in a plurality of stripes receives a request to write data. The processing device determines a total number of available stripe units to satisfy the request, identifies one or more stripes of the plurality of stripes that collectively include at least the total number of available stripe units, allocates the one or more stripes to the request, and stores the data for the request in the available stripe units of the one or more stripes.

21 Claims, 9 Drawing Sheets

SPREAD SPACE TRACKING

FIELD OF TECHNOLOGY

This disclosure relates generally to the field of data storage and in particular to data stripe tracking for storage devices.

BACKGROUND

Networked storage arrays may provide an enterprise level solution for secure and reliable data storage. Data striping is a technique used in some storage arrays where logically sequential data is segmented so that consecutive segments are stored on different drives in the array. Data striping can provide significant performance gains for a requestor that can process data faster than can be provided by a single drive by spreading data segments across multiple drives that can be accessed concurrently. However, data striping can involve added overhead when data is re-written to the array. New write requests to rewrite previously stored data can invalidate segments in the array, leaving the invalid segments to be reused for subsequent requests. When invalid segments are later reused, the storage array may need to perform parity calculations for the entire stripe that includes the rewritten segment. Parity calculation overhead can increase exponentially if new writes reuse segments that span multiple stripes.

BRIEF DESCRIPTION OF THE DRAWINGS

The embodiments described herein will be understood more fully from the detailed description given below and from the accompanying drawings.

DETAILED DESCRIPTION

Figure 1:
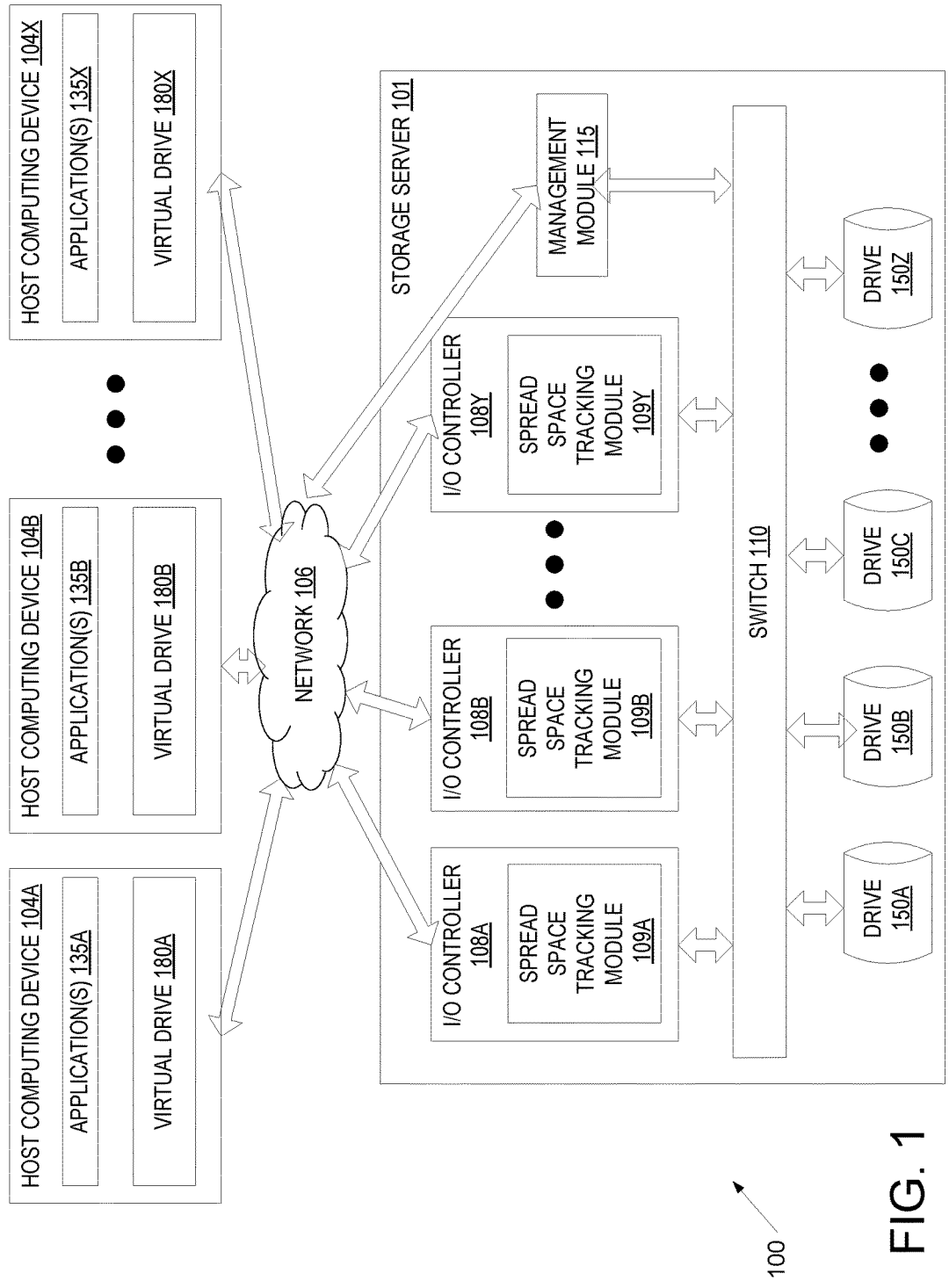
FIG. 1 is a block diagram example of a network architecture, in which embodiments described herein may operate.

Described herein are systems and methods that enable and implement spread space tracking to improve storage array performance. As further described herein, spread space tracking provides the ability to efficiently track and manage free space in data stripes that are spread across a storage array. Data striping for storage arrays can provide low latency for read requests in many situations since total data throughput is increased by utilizing multiple drives in the storage array. However, repeated writing and re-writing of data typically involves occasionally invalidating stripe segments (or "stripe units") within a storage array to make them available for use with subsequent write requests.

Data striping in storage arrays, however, can present some data integrity risks. Since different segments of a data sequence are stored in different stripe units on different drives, a failure to access a single stripe unit on one of the drives can result in the corruption of the entire data sequence of that single stripe. These risks are can be mitigated by storing redundant information in the storage array in order to facilitate error correction. I/O controllers of a storage array can complete parity calculations to generate the redundant information each time a stripe unit of a stripe is updated. However, as the stripes become more fragmented with additional subsequent re-writing of data, utilizing available stripe units for new writes can lead to excessive parity calculations. For example, if multiple available stripe units are used to satisfy a write request, and the available stripes are located in different stripes, a parity calculation operation should be performed for each stripe used for the write. These parity calculations can increase overhead substantially in instances where the available stripe units allocated to the write request are located in different stripes in the array. Moreover, in typical implementations, available stripe units may be selected randomly, or in the order the stripe units were made available without taking into account the number of stripes used to satisfy the request.

Embodiments described herein provide a spread space tracking module of a storage server I/O controller that can identify available stripe units that "best fit" a write request to reduce the overhead produced by parity calculations, thus improving the performance of the storage array. The total stripe space for the array can be divided into fixed size blocks of contiguous stripes referred to as "stripe groups." Within each stripe group, stripes with similar numbers of available stripe units are linked together using mapping data structures (e.g., mapping tables, linked lists, etc.). When a request is received to write data to the storage array, the information in the mapping data structures is accessed to determine the "best fit" stripe (or stripes) to satisfy the request that limits the number of parity calculations. The spread space tracking module may identify the stripe group that has stripes with the greatest number of available stripe units to be allocated to the request in comparison to all other stripe groups in the array. Thus, the spread space tracking module may provide the least number of stripes sufficient to satisfy a write request, which minimizes the overhead for parity calculations.

In embodiments, the I/O controller may receive a request from a requestor such as a remote computing device (e.g., a remote server or remote host) to write data to a virtual storage device that is mapped to physical storage devices (e.g., drives) on a storage server. The I/O controller may determine a total number of available stripe units to satisfy the request. The I/O controller may then identify one or more stripes of the plurality of stripes that collectively include at least the total number of available stripe units. The I/O controller may then allocate the one or more identified stripes to the request, and store the data for the request in the available stripe units.

FIG. 1 is a block diagram example of a network architecture 100, in which embodiments described herein may operate. The network architecture 100 may include one or more host computing devices (e.g., host computing devices 104A, 104B through 104X) connected to a storage server 101 via a network 106. Network 106 may be a wide area network (WAN) such as the Internet, a local area network (LAN), a storage area network (SAN) or a combination thereof. The host computing devices 104A-X and/or storage server 101 may connect to the network 106 via an Ethernet, Fibre Channel (FC), Fibre channel over Ethernet (FCoE), Infiniband®, serial attached small computer system interface (SAS) or serial ATA (SATA) protocol. Alternatively, other protocols may be used to connect to the network 106.

Storage server 101 is a computing device that is configured and optimized to provide storage to local and/or remote computing devices (e.g., to host computing devices 104A-X, also referred to herein as client computing devices). Storage server 101 may be configured as a storage area network (SAN), network attached storage (NAS), or other remote storage type. Though a single storage server 101 is shown, the host computing devices 104A-X may connect to multiple storage servers. The multiple storage servers may be arranged in a cluster or other configuration.

Host computing devices 104A-X may each include a physical machine and/or a virtual machine hosted by a physical machine. The physical machine may be a rack-mount server, a desktop computer, or other computing device. In one embodiment, one or more host computing device 104A-X includes a virtual machine managed and provided by a cloud service provider system. Each virtual machine offered by a cloud service provider system may be hosted on a physical machine configured as part of a cloud. Such physical machines are often located in a data center. The cloud service provider system and cloud may be provided as an infrastructure as a service (IaaS) layer. One example of such a cloud is Amazon's® Elastic Compute Cloud (EC2®).

Each host computing device 104A-X may host one or more applications 135A-X. The applications 135A-X may be application servers, web servers, standalone applications, and so forth. Accordingly, host computing devices 104A-X may provide services to clients via applications 135A-X in some embodiments.

Each host computing device 104A-X may additionally mount or otherwise connect to one or more virtual drives 180A, 180B through 180X (e.g., one or more logical unit numbers (LUNs) and/or one or more virtual NVMe drives). Though each host computing device 104A-X is shown to mount a different virtual drive 180A-X, different host computing devices may mount or connect to the same virtual drive. Each virtual drive 180A-X is a logical storage device that maps a logical storage address space to physical storage address spaces of multiple storage devices (e.g., drives 150A, 150B, 150C through 150Z of storage server 101) and/or to other local address spaces that are in turn mapped to the physical storage address spaces. Additionally, a virtual drive 180A-X may map a logical storage address space to physical storage address spaces of storage devices on multiple different storage servers.

Storage server 101 includes multiple I/O controllers 108A, 108B through 108Y connected to multiple drives 150A, 150B, 150C, through 150Z via a switch 110. The drives 150A-Z may be physical storage devices such as solid state drives (SSDs) (e.g., SAS/SATA drives, non-volatile memory express (NVMe) drives, small computer system interface (SCSI) over PCIe (SOP) drives, or solid state drives that communicate using different protocols), conventional disk drives, or any other storage media. The number of drives included in storage server 101 may be less than 10 to more than 100. The drives may have the same or different storage capacities. In some implementations, the number of host computing devices 104A-X, the number of I/O controllers 108A-Y, and the number of drives 150A-Z may be different from each other.

Switch 110 is a multi-port bridge that connects I/O controllers 108A-Y to drives 150A-Z. Switch 110 manages the flow of data within storage server 101 by connecting specific I/O controllers 108A-Y to specific drives 150A-Z on a message by message basis, allowing the switch 110 to regulate the flow of traffic. Each I/O controller 108A-Y and each drive 150A-Z connected to switch 110 can be identified using a unique address (e.g., a unique port address) of the I/O controller or drive. Switch 110 may be a PCIe switch, an Ethernet switch, a SAS or SATA expander, a USB switch, or other type of switch.

In embodiments, each drive 150A-Z may be a solid state drive (also referred to as a solid state storage device or SSD) that is a non-volatile storage device that uses integrated circuits to persistently store data. SSDs have numerous advantages over traditional disk drives. As compared to disk drives, SSDs are more resilient, consume less power, and have lower latency (access times). In one embodiment, drives 150A-Z are NAND-based Flash memory devices or NOR-based Flash memory devices. Flash memory devices are non-volatile and can be electronically erased and reprogrammed. Alternatively, one or more drives 150A-Z may be volatile memory-based solid state drives (e.g., dynamic random access memory (DRAM)-based SSDs) that have a battery backup. Drives 150A-Z may include one or more ports (e.g., PCIe ports) to connect to switch 110. Drives 150A-Z may connect to switch 110 via PCIe, SCSI, SAS, USB, or other connection protocols.

In embodiments where drives 150A-Z are SSDs, each drive 150A-Z may have a controller and a storage area that includes memory (e.g., NAND Flash non-volatile memory) to store data. The storage area is divided into pages, which is the smallest unit of storage to which data may be stored. SSD pages may have sizes based on a configuration of an SSD. For example, drives 150A-Z may have pages that are 4 kilobytes (kB), 8 kB, or 16 kB. However, other page sizes are also possible. SSD pages are grouped into blocks. Each block contains a particular number of pages, which is again dependent on a design of a particular SSD. Typical SSDs have blocks that include 256 pages. Conventionally an SSD may only perform a write or a read to a single page in a block at a time.

Drives 150A-Z may be configured in an array such that logically sequential data can be segmented across the array using data striping. In some embodiments, the array may be configured such that a single stripe spans all of the drives in the array. Alternatively, the array may be configured such that a single stripe spans only a portion of the drives in the array. In this latter case, the drives in the array may be divided into media sets where a single stripe spans the drives in a media set. For example, an array with 18 drives may be configured with two media sets of 9 drives each, where a single stripe spans 9 drives of a media group. The two media sets of 9 drives may be combined to form a media group of two media sets.

Each drive used in striping can be divided into a set of stripe units. Each stripe unit of a single drive can be allocated to a different stripe. A single stripe includes a single stripe unit from each of the drives in the stripe. For example, where a storage array of 18 drives is configured such that a single stripe spans all 18 drives, each of the 18 drives includes a stripe unit allocated to a single stripe, and each stripe includes 18 stripe units (one stripe unit for each of the drives in the stripe). In some implementations, where the drives are SSDs, a stripe unit may be the size of a page of an SSD (e.g., 4 kB, 8 kB, 16 kB, etc.). Alternatively, a stripe unit may be a block of an SSD that includes multiple SSD pages.

In some implementations, each drive may maintain information that tracks the available stripe units across the stripe. In one embodiment, the drive may store a bitmap, where each row of the bitmap is associated with a particular stripe, and where each bit in a row of the bitmap is associated with a stripe unit for that stripe. Alternatively, a separate bitmap may be maintained for each stripe. Thus, a stripe that includes 18 stripe units (e.g., 18 drives) may have an associated bitmap (or a row of a bitmap) with 18 bits (1 bit per stripe unit for that stripe). Each bit in the bitmap may be set to one value to indicate an available stripe unit (e.g., a stripe unit that is available for new writes), and to a different value to indicate a used stripe unit (e.g., a stripe unit not available for new writes). For example, a bit value of '0' may indicate an available stripe unit and a bit value of '1' may indicate an unavailable stripe unit. Alternatively, other values may be used.

In embodiments, the stripe bitmap nay be stored on each drive in the array. In some implementations, a portion of each drive may be reserved for storing and maintaining the one or more stripe bitmaps for the storage array as well as other metadata information associated with the drive. For example, a predetermined number of stripes within the storage array (and stripe units within each drive) may be dedicated to maintaining the one or more stripe bitmaps. Thus, the one or more stripe bitmaps and other metadata may be separated from the portion of the drive that stores data written to the drive. As noted above, each drive may maintain a copy of the one or more stripe bitmaps for each stripe in the array. Thus, each of the drives may include the information needed to determine available stripe units on any of the drives in the storage array. Alternatively, each drive may only include the bitmap information associated with that particular drive. In these latter cases, a drive may only be able to determine the available stripe units for that particular drive. In other embodiments, the one or more stripe bitmaps may be stored on I/O controller 108A-Y, rather than on the drive or in addition to on the drive.

In embodiments, the total stripe space in the storage array may be logically divided into sequential groupings of stripes (or "stripe groups"). For example, an array of 18 drives may have a total stripe space of 1,000 stripes, where the first 100 stripes (stripes 1-100) are allocated to one stripe group, the next sequential 100 stripes (stripes 101-200) are allocated to a second stripe group, and so on. By dividing the stripes in the array into groups, the number of available stripe units in each stripe group may be more efficiently managed and utilized for write operations as described in further detail herein.

In embodiments, the array of drives may be configured in a particular redundant array of independent disks (RAID) configuration. Different RAID configurations may have different levels of redundancy and/or parity. In one embodiment, the drives may be configured with block level striping performed across the drives with one or more dedicated parity disks (RAID 4). In an alternative embodiment, the drives may be configured where block level striping is used and parity is distributed across the different drives (RAID 5). In another embodiment, the drives may be configured where block level striping is used with double distributed parity that provides fault tolerance for up to two unavailable storage devices (RAID 6). In other embodiments, other RAID configurations may be utilized with varying degrees of redundancy and/or parity.

In some implementations, stripe units dedicated to parity may be distributed across the drives in a stripe. For example, as noted above, a storage array of 18 drives may be configured such that a single stripe spans all 18 drives, so each stripe includes 18 stripe units (one stripe unit for each of the drives in the stripe). In implementations where two drives are dedicated to parity in the storage array, two stripe units for each stripe may be used to store the parity information for that stripe. Thus, 16 of the 18 stripe units in each stripe may be used to store data. In various embodiments, the stripe units used for parity may be in dedicated drives that are used for parity for all stripes. Alternatively, the stripe units used for parity may be spread across any of the drives in the storage array.

Each I/O controller 108A-Y is a device configured to connect one or more host computing devices 104A-X to one or more drives 150A-Z. Each I/O controller 108A-Y includes one or more network interface controllers (NICs) such as Ethernet NICs and/or other protocol adapters (e.g., such as FC, SAS/SATA, or Infiniband (TB) adapters) that connect that I/O controller to network 106. Each I/O controller 108A-Y additionally includes a port that connects to switch 110 via an internal bus. Though only a single switch 110 is shown, the I/O controllers 108A-Y may include multiple ports for connecting to multiple different switches and associated fabrics.

In one embodiment, I/O controllers 108A-Y include peripheral component interconnect express (PCIe) ports that connect to switch 110 via a PCIe bus. Alternatively, or additionally, I/O controllers 108A-Y may include small computer system interface (SCSI) ports, serial attached SCSI (SAS) ports, serial ATA (SATA) ports, Fibre Channel ports, or universal serial bus (USB) ports or other ports for connecting to the switch 110. I/O controllers 108A-Y may additionally include a volatile and/or non-volatile memory to store firmware and/or software for performing operations described herein. Volatile memory may also be used for a data cache or buffer (e.g., as a write cache and/or a read look ahead cache). For example, I/O controllers 108A-Y may include a main memory (e.g., read-only memory (ROM), flash memory, dynamic random access memory (DRAM) such as synchronous DRAM (SDRAM), etc.) and a static memory (e.g., flash memory, static random access memory (SRAM), etc.).

I/O controllers 108A-Y may additionally include a processing device representing one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core central processing unit (CPU), a multi-core CPU and a massively multi-core system that includes many interconnected integrated circuits, each of which may include multiple processor cores. The processing device may therefore include multiple processors. The processing device may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like. In one embodiment, each I/O controller 108A-Y is a system on a chip (SoC) including a processing device, a memory, one or more NICs and one or more internal ports.

Each I/O controller 108A-Y is assigned to one or more host computing devices 104A-X, and handles input/output (I/O) commands for those host computing devices. Applications 135A-X running on a host computing device 104A-X may attempt to read data from and/or write data to a virtual drive 180A-X that the host computing device 104A-X has access to (e.g., that has been presented to the host computing device 104A-X). Responsive to such a read or write request, the host computing device 104A-X sends a host command to the I/O controller 208A-X that is assigned to that host computing device 204A-X to initiate the read or write operation. As used herein, a host command is a read or write command that originates at a host computing device.

When the I/O controller 108A-Y receives a read or write command from the host computing device 104A-X, the I/O controller 108A-Y extracts the read or write command from the message and determines what logical addresses of the virtual drive 180A-X should be used to write the data to or read the data from. The I/O controller 108A-Y may additionally translate the logical addresses of the virtual drive to physical addresses of the drives 150A-Z. For example, if a read command is received, the I/O controller 108A-Y may determine which drive 150A-Z store the information to be read as well as which physical addresses on those drives the data should be read from. If a write command is received, the I/O controller 108A-y may determine the number of stripe units needed to satisfy the request and identify one or more stripes within the storage array to which to write the data.

The I/O controller 108A-Y may then generate one or more sub-commands directed to the determined drive 150A-Z to write data to those drives 150A-Z or read data from those drives 150A-Z. The I/O controller 108A-Y may additionally allocate buffer space for each of the sub-commands in a memory of the I/O controller 108A-Y. I/O controllers 108A-Y may additionally include array configuration information for the drives 150A-Z that identifies how the drives 150A-Z have been arranged into an array (e.g., that identifies a RAID configuration for the array, stripes of the array, stripe groups of the array, and so on). The array configuration information may include data structures that identify the available stripe units in the storage array that may be used for incoming write requests. Particularly as described in further detail herein, the available stripe units may be organized by stripe group, to show which stripe groups include the stripes with particular numbers of available stripe units that may be reused. Additionally, the array configuration information may be used to reconstruct data of one or more virtual drives 180A-X if one or more of the drives 150A-Z becomes unavailable. The drives 150A-Z may become unavailable due to a drive failure, performance degradation due to execution of a background operation (e.g., an erasure operation, storage reclamation processing such as garbage collection, etc.), or the like.

Each I/O controller 108A-Y may include a spread space tracking module 109A-Y that identifies the stripes in the storage array that are the "best fit" for incoming write requests. The identification and use of "best fit" stripes may minimize the overhead for parity calculations as described above. Responsive to receiving a request to write data to a logical address of a virtual storage device that is mapped to drives 150A-Z, I/O controller 108A-Y may invoke spread space tracking module 109A-Y to identify stripes in the storage array with the most available stripe units that may be used for the write request.

As noted above, an available stripe unit may be a stripe unit in the storage array that is available to be used to satisfy a write request. Meaning, the stripe unit may be space in a stripe on one of the drives in the storage array to which data may be written. The stripe unit may be available because no data has been written to that stripe unit. Alternatively, the stripe unit may be available because data that was previously written to that stripe unit was later rewritten. SSDs apply log structured storage principles, so when data is overwritten in implementations where the drives are SSDs, the stripe unit that originally stored the data is invalidated and the modified data is written to a new stripe unit. Once a stripe unit (e.g., a memory page) is invalidated, it may become available to store new data.

The write request may be received from a requestor, which may be one of applications 135A-X on host computing devices 104A-X. As noted above, drives 150A-Z may be arranged in a plurality of stripes, where each stripe includes a plurality of stripe units, and each stripe unit for a single stripe is associated with a single drive of drives 150A-Z.

To identify the "best fit" stripes, spread space tracking module 109A-Y may first determine a total number of available stripe units to satisfy the request. In some implementations, this determination may be made by first determining a stripe unit size for the drives in the storage array, then dividing the amount of data to be written to satisfy the request by stripe unit size. For example, if the write request is attempting to write 1 MB of data, and the array is configured with stripe units of 4 kB, then 250 stripe units may be needed to satisfy the request.

Spread space tracking module 109A-Y may then identify one or more stripes of the plurality of stripes in the storage array that collectively include at least the total number of stripe units to satisfy the write request. To do so, spread space tracking module 109A-Y may first determine a number of available stripe units to be used for a single stripe in the array. In some embodiments, the number of available stripe units to be used may be the maximum number of available stripe units for a single stripe. Meaning, spread space tracking module 109A-Y may attempt to identify the stripes with the greatest number of available stripe units in those stripes in comparison to the other stripes in the array.

For example, if the storage array is configured with 18 drives, then each stripe in the array can include 18 total stripe units (one stripe unit for each of the 18 drives). Thus, a stripe that is entirely available for write requests may include 18 available stripe units. At some times, the storage array may include stripes with 18 available stripe units. At other times, the storage array may not include any stripes with 18 available stripe units (e.g., valid data that cannot yet be deleted has been written to at least one stripe unit in each stripe of the array). In these latter cases, the greatest number of available stripe units for any stripe in the array may be a number less than 18 (e.g., 17, 16, 15, etc.). Thus, the maximum number of available stripe units for a single stripe may be this lesser number at various points in time.

In some implementations, in which the stripes are arranged in stripe groups, spread space tracking module 109A-Y may then identify a stripe group in the array that includes at least one stripe with the number of available stripe units to be used for a single stripe. For example, spread space tracking module 109A-Y may first determine that the greatest number of available stripe units in a single stripe is 18. Spread space tracking module 109A-Y may then identify the stripe groups in the array that include the stripes with 18 available stripe units. Similarly, spread space tracking module 109A-Y may determine that the greatest number of available stripe units in a single stripe is 15. In this case, spread space tracking module 109A-Y may then identify the stripe groups in the array that include the stripes with 15 available stripe units.

Spread space tracking module 109A-Y may then identify the stripes in the identified stripe groups with the identified number of available stripe units.

Once the stripes have been identified, spread space tracking module 109A-Y may then allocate the stripes to the write request and store the data in the available stripe units of the allocated stripes. Subsequently, or concurrently, spread space tracking module 109A-Y may compute and store a parity value for each of the stripes allocated to the write request. As noted above, by identifying the stripes with the greatest number of available stripe units, fewer stripes may be allocated for write requests, and thus fewer parity calculations may be performed for rewriting data. I/O controller 109A-Y and spread space tracking module 109A-Y are described in further detail below with respect to FIG. 2.

Storage server 101 additionally includes a management module 115. Management module 115 may be a device configured to perform particular operations with regards to management of the array of drives 150A-Z. Management module 115 may include a processing device, a port for connecting to switch 110 and a NIC for connecting to network 106. Management module 115 may additionally include a volatile and/or non-volatile memory to store firmware and/or software for performing operations described herein. In one embodiment, management module 115 is a SoC.

The management module 115 determines how to configure the array of drives 150A-Z and further determines configurations for the one or more virtual drives 180A-X. For example, management module 115 may determine which virtual drives 180A-X map to which physical drives and which portions of those drives the virtual drives map to. Once these configurations are determined, management module 115 may send these configurations to the I/O controllers 108A-Y for implementation. Management module 115 additionally performs discovery operations and may be responsible for pairing I/O controllers 108A-Y with host computing devices 104A-X.

Figure 2:
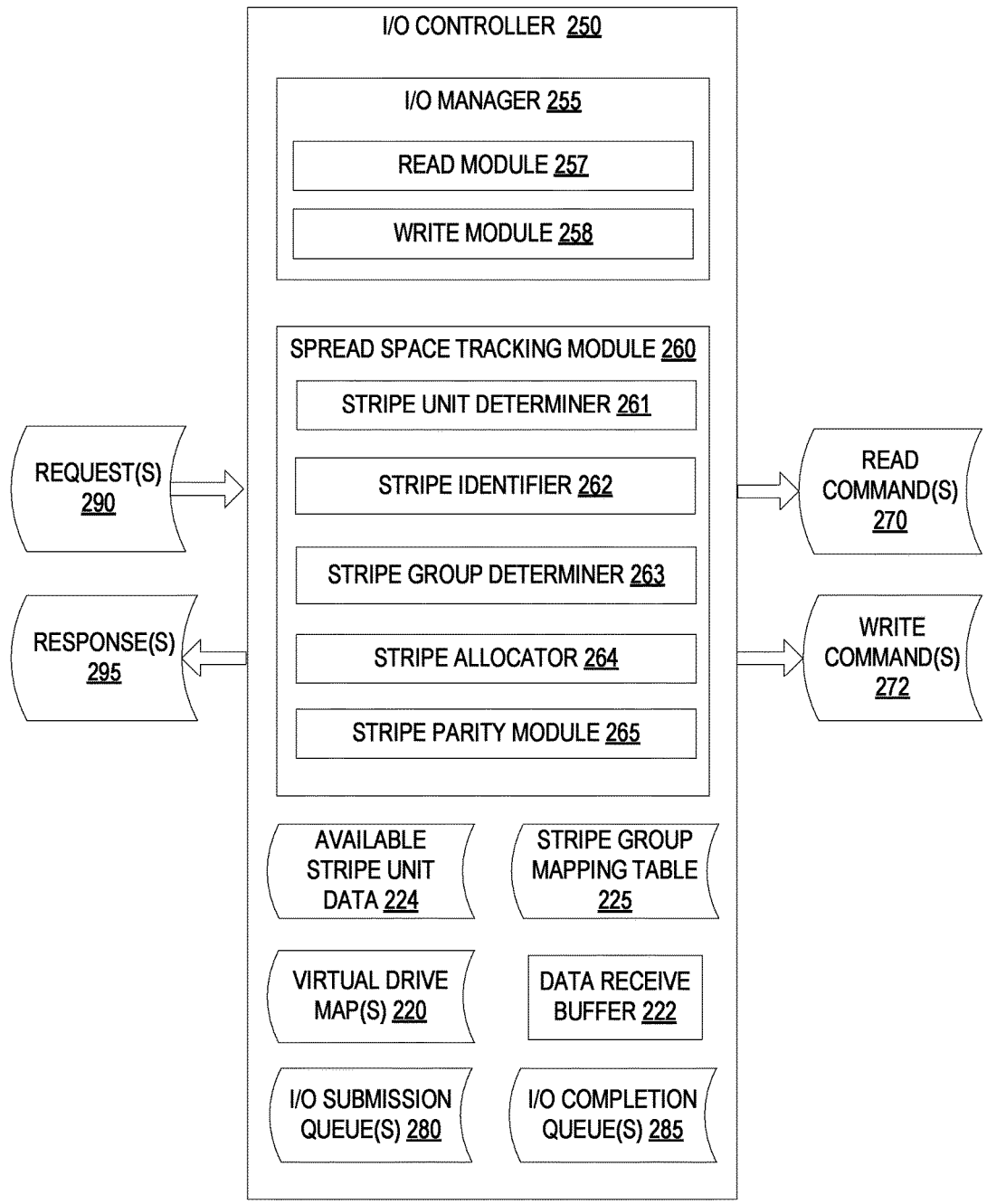
FIG. 2 is a block diagram of one embodiment of an I/O controller.

FIG. 2 is a block diagram of one embodiment of an I/O controller 250 showing logical modules that may be loaded into and executed by a processing device of I/O controller 250. Alternatively, I/O controller 250 may include one or more physical modules (e.g., an integrated circuit (IC) designed with described modules or a configurable logic such as a field programmable gate array (FPGA) configured to have the modules). In one embodiment, I/O controller 250 corresponds to an I/O controller 108A-Y of FIG. 1.

In one embodiment, I/O controller 250 includes the module of an input/output (I/O) manager 255. The I/O manager 255 in one embodiment includes a read module 257 and a write module 258. Alternatively, the read module 257 and/or write module 258 may be distinct modules that are separate from I/O manager 255.

I/O manager 255 is responsible for communicating with host computing devices and satisfying input/output (I/O) commands such as read commands and write commands from the host computing devices. I/O controller 250 receives requests 290 from host computing devices. The requests 290 may be, for example, messages encapsulated as Ethernet packets. The received requests 290 may contain I/O commands and/or data. Responsive to receipt of a request 290 from a host, I/O manager 255 may remove an I/O command and/or data from the request and/or determine which module 257-258 should handle the data or I/O command.

Responsive to receipt of a read command, I/O manager 255 invokes read module 257. Read module 257 is responsible for responding to read commands. In one embodiment, the command payload of the read command identifies specific logical block addresses of a virtual storage device (e.g., a virtual NVMe drive) from which data is to be read. For example, the command payload may identify a particular logical block address and a length. Read module 257 may use virtual drive map 220 for the virtual drive to determine what locations (e.g., what SSD pages) on the drives correspond to the logical block addresses of the virtual drive.

Read module 257 may then generate read commands 270 for each of the storage devices storing data to be read. For example, if a virtual drive maps to three physical drives, read module 257 may determine first memory pages on a first drive storing requested information, second memory pages on a second drive storing requested information and third memory pages on a third drive storing requested information. Read module 257 may then generate a first read command directed to the first memory pages of the first drive, a second read command directed to the second memory pages of the second drive, and a third read command directed to the third memory pages of the third drive. The read commands may be placed into I/O submission queues 280 for each of the drives that are managed by the I/O manager. Once a read command reaches the front of an I/O submission queue 280, read module 257 may then send the generated read command to the appropriate drive.

Responsive to receipt of a write command, I/O manager 255 invokes write module 258. Write module 258 is responsible for responding to write commands. In one embodiment, the command payload of the write command identifies one or more logical block addresses to write the data to and/or a length of data to be written. Write module 258 may determine what locations (e.g., stripe units) on the physical storage devices (e.g., physical NVMe drives) to write the data to. Write module 258 may additionally associate the one or more logical block addresses to the stripe units (e.g., to the physical storage locations on the physical storage devices). The selection of stripe units is discussed in greater detail below with reference to spread space tracking module 260.

Following the request (e.g., Ethernet packet) encapsulating the write command, I/O controller 250 may receive additional requests identifying the particular write command and encapsulating data to be written that is associated with the write command. Since Ethernet packets have a dictated maximum size, the data to be written may be broken up into portions, where each portion can be encapsulated within a separate Ethernet packet. I/O manager 255 may remove the data from each such request (e.g., from each Ethernet packet) and provide the data to write module 258. Write module 258 may add the received data extracted from the Ethernet packets (or other messages) into a data receive buffer 222.

Write module 258 may then generate write commands 272 for each of the storage devices to which the data will be written, where the write commands 272 may each be directed to a different stripe unit. Accordingly, if the drives are SSDs and the stripe units are each a memory page, then each write command 272 may be to a single memory page in an SSD. The write commands 272 may be placed into I/O submission queues 280 for each of the drives that are managed by the I/O manager. Once a write command reaches the front of an I/O submission queue 280, write module 258 may then send the generated write command to the appropriate drive.

The drives receive the write commands and write the data in the commands to the specified locations (e.g., to the stripe units). The drives then return a completion notification. These completion notifications may be added to I/O completion queue 285. Once completion notifications have been received from each of the drives to which data was written, write module 258 may generate a response 295 (e.g., a new Ethernet packet having the above identified format). Write module 258 may then encapsulate the completion notification into the response 295. Write module 258 may then send the response 295 to the host.

I/O controller 250 may additionally include spread space tracking module 260 that can reduce overhead associated with parity calculations by identifying "best fit" stripes in the array to allocate to a write request. In one embodiment, spread space tracking module 260 is a component of write module 258. In some implementations, spread space tracking module 260 may include stripe unit determiner 261, stripe identifier 262, stripe group determiner 263, stripe allocator 264, and stripe parity module 265. Alternatively, the stripe unit determiner 261, stripe identifier 262, stripe group determiner 263, stripe allocator 264, and stripe parity module 265 may be distinct modules that are separate from spread space tracking module 260. In one embodiment, spread space tracking module 260 corresponds to spread space tracking module 109A-Y of FIG. 1.

Upon receiving a write request, write module 258 may invoke spread space tracking module 260 to identify the optimal number stripes in the storage array to satisfy the request. In one embodiment, spread space tracking module 260 may invoke stripe unit determiner 261 to determine the total number of available stripe units that are sufficient to satisfy the write request. As noted above, this determination may be made by first determining a stripe unit size for the plurality of drives in the storage array, and then dividing the amount of data to be written by the write request by the stripe unit size. For example, if the write request is attempting to write 1 MB of data, and the array is configured with stripe units of 4 kB, then 250 stripe units may be needed to satisfy the request.

Once the total number of available stripe units sufficient to satisfy the request has been determined, stripe identifier 262 may then be invoked to identify one or more "best fit" stripes in the storage array that collectively include at least the determined total number of available stripe units. In some embodiments, the "best fit" stripes are those stripes that have the most available stripe units that may be allocated to the write request in comparison to the other stripes in the array. In some embodiments, the "best fit" stripe may be a stripe that has the exact number of available stripe units to satisfy the request. Thus, a minimal amount of stripes may be allocated to the write request in order to reduce parity calculation processing overhead.

Prior to stripe identifier determining the best fit stripes, stripe identifier 262 may first determine a number of available stripe units to be used for a single stripe in the array. In some embodiments, the number of available stripe units to be used may be the maximum number of available stripe units for a single stripe. In other words, stripe identifier 262 may identify the stripes with the greatest number of available stripe units in those stripes in comparison to the other stripes in the array. In embodiments, stripe identifier 262 may make this determination by first determining the largest number of stripe units in a stripe, and then determining whether any stripes in the array have that number of available stripe units. For example, if a stripe includes 18 stripe units, stripe identifier may first determine whether any stripes have 18 available stripe units (e.g., 18 stripe units that are available for use). If so, stripe identifier 262 can then proceed with allocating those stripes to the write request as described herein. Otherwise, stripe identifier may identify the stripes with the next lower number of available stripe units working in descending order (e.g., 17, then 16, then 15, etc.).

In some embodiments, where the total number of stripe units sufficient to satisfy the write request is less than or equal to the total number of stripe units in a single stripe, stripe identifier 262 may identify a single stripe that includes that number of available stripe units. For example, if the array is configured with stripes that include 18 stripe units and a write request is received that can be satisfied with 7 stripe units, stripe identifier 262 can identify a single stripe that includes at least 7 available stripe units. If no stripes in the array include that number of available stripe units, stripe identifier 262 may then identify a stripe with the next higher number of available stripe units, working in ascending order (e.g., 8, then 9, then 10, etc.).

Once stripe identifier 262 has determined the number of available stripe units to be used for a single stripe, stripe group determiner 263 may be invoked to identify a stripe group that includes at least one stripe with that number of available stripe units. For example, stripe identifier 262 may first determine that the greatest number of available stripe units in a single stripe is 18 (e.g., there are stripes in the array with 18 available stripe units). Stripe group determiner 263 may then identify the stripe groups in the array that include those stripes with 18 available stripe units.

In one embodiment, stripe group determiner 263 may identify a stripe group with the largest number of stripes that include the target number of available stripe units for a single stripe. For example, if stripe identifier 262 has determined that the target number of available stripe units for a single stripe is 18 (e.g., identify stripes with 18 available stripe units), stripe group determiner 263 can identify and select a stripe group in the array that includes the largest number of stripes with 18 available stripe units.

In some implementations, stripe group determiner 263 may identify the stripe group by first identifying an entry in a list that maps the target number of available stripe units to a set of stripe groups that each includes one or more stripes with the target number of available stripe units. In one embodiment, the list may be an array that maps the target number of available stripe units to a corresponding tree structure for that target number of available stripe units. For example, if the target number of available stripe units is 18 (e.g., identify stripe groups that include stripes that each include 18 available stripe units), stripe group determiner may access the array entry that corresponds to 18 available stripe units (e.g., the $18^{th}$ entry in the array). The tree structure may store the set of stripe groups that each includes at least one stripe with the target number of available stripe units. In some implementations, the list and the tree structures may be stored in available stripe unit data 224.

Stripe group determiner 263 may access the tree structure associated with the set of stripe groups that each includes the target number of available stripe units. Stripe group determiner 263 may then select a stripe group from the set of stripe groups stored in the tree structure. In some implementations, the tree structure may include an entry for each stripe group with the target number of available stripe units, indexed by the number of stripes that each stripe group includes with that target number of available stripe units. Each entry in the tree structure may also include additional information for each stripe group. For example each entry may include a reference to a stripe group mapping table (e.g., stripe group mapping table 225) with information associated with each of the stripes in that particular stripe group. The stripe group mapping table 225 is described in further detail below.

In one embodiment, stripe group determiner 263 may use the tree structure to select a stripe group that includes the largest number of stripes with the target number of available stripe units in comparison to other stripe groups in the set. Thus, stripe group determiner 263 may identify the stripe group that includes the stripes with the greatest amount of available space, regardless of the total amount of data in the write request. In other embodiments, stripe group determiner 263 may select a stripe group that includes enough stripes with the target number of available stripe units. To do so, stripe group determiner 263 first determines the number of stripes with the target number of available stripe units needed to satisfy the request, and then selects a stripe group from the set of stripe groups in the tree structure that includes at least the number of stripes with the target number of available stripe units.

For example, stripe group determiner 263 may access the tree structure associated with the set of stripe groups that include stripes with 18 available stripe units. Stripe group determiner 263 may determine, using the total number of stripe units usable to satisfy the request, that 7 stripes with 18 available stripe units are sufficient to satisfy the write request. Stripe group determiner 263 may use the tree structure to identify a stripe group that has at least 7 stripes with 18 available stripe units, even if there are groups with a greater number of stripes with 18 available stripe units. Thus, if there is a stripe group with 7 stripes and a stripe group with 10 stripes, stripe group determiner 263 can select the stripe group with 7 stripes. Similarly, if there is a group with 6 stripes, a group with 8 stripes, and a group with 10 stripes, stripe group determiner can select the stripe group with 8 stripes. An illustrative example of a tree structure is described in further detail below with respect to FIG. 4.

Once a stripe group has been selected, stripe identifier 262 may then identify at least one stripe in the selected stripe group with the target number of available stripe units. Alternatively, in some embodiments the stripes are not divided into stripe groups. In such embodiments, stripe identifier 262 may identify stripes to write data to without taking stripe groups into consideration.

In embodiments, stripe identifier 262 may identify an entry in stripe group mapping table 225 that maps an identifier associated with the selected stripe group to a list of stripes in the selected stripe group with the target number of available stripe units. In some implementations, stripe group mapping table 225 may include a mapping table entry for each stripe group in the storage array. Each mapping table entry may include information that maps a number of available stripe units to the stripes in the stripe group that include that number of available stripe units.

For example, in a storage array configured with 18 drives (and 18 stripe units per stripe), the mapping table entry for each stripe group can include the number of stripes in that stripe group with 18 available stripe units, the number of stripes in that stripe group with 17 available stripe units, the number of stripes in that stripe group with 16 available stripe units, and so on. Additionally, the mapping table entry may also include a reference to a list of stripes in the stripe group that include the corresponding number of available stripe units. For example, the mapping table entry may include a reference to a list of the stripes in the stripe group with 18 available stripe units, a reference to a list of the stripes in the stripe group with 17 available stripe units, a reference to a list of the stripes in the stripe group with 16 available stripe units, and so on. In some implementations, the list of stripes in the stripe group may be stored as a doubly linked list, and each reference may point to the first stripe in the list with that number of available stripe units. The first stripe in the list may include a reference to the next stripe in the list with that number of available stripe units, and so on. Each stripe in the list may include references to the next and the previous entries in the list for that number of available stripe units. An illustrative example of the stripe group mapping table entry and a stripe list is described in further detail below with respect to FIG. 4.

If stripe groups are not used, then an array mapping table may be used instead of the stripe group mapping table 225. The array mapping table may operate similarly to the stripe group mapping table, but may contain data for the entire array rather than for just a single stripe group. For example, the array mapping table may indicate the total number of stripes with 18 available stripe units, the total number of stripes with 17 available stripe units, and so on.

Stripe identifier 262 may then select at least one stripe in the stripe group with the target number of available stripe units using the stripe group mapping table entry. For example, stripe identifier 262 may access the reference in the stripe group mapping table entry to identify the first stripe in the linked list of stripes with the target number of available stripes. Stripe identifier 262 may select that stripe and remove the information associated with the selected stripe from the list. For example, stripe identifier 262 may 'pop' the first entry from the top of the list, modify the reference in the stripe group mapping table entry to point to the next stripe in the list with the target number of available stripe units, decrement the counter in the stripe group mapping table entry, and pass the selected stripe information to stripe allocator 264 to be used to satisfy the write request. Similarly, once the stripes have been allocated to the write request, the tree structure described above may be updated accordingly to decrement the counts associated with the selected stripe group.

In some implementations, the selected stripe group may not include enough stripes with the target number of available stripe units to satisfy the write request. Accordingly, the stripes in the selected stripe group with the target number of available stripe units may collectively include fewer than the total number of stripe units that will satisfy the request. In these cases, stripe identifier 262 may then identify additional stripes to satisfy the request. In one embodiment, stripe group determiner 263 may be invoked again to identify and select a second stripe group that includes at least one stripe with the target number of available stripe units. Stripe group determiner 263 may utilize the same process as described above to identify the entry in the tree structure that includes a second stripe group with the largest number of stripes (or target number of stripes) with the target number of available stripe units in comparison to other stripe groups in the set. Stripe identifier 262 may then repeat the above process to identify the stripes in the second stripe group with the target number of available stripe units, and allocate the needed stripes to the write request.

For example, stripe group determiner 263 may have determined, using the total number of stripe units that were determined to satisfy the write request, that 20 stripes with 18 available stripe units are will satisfy the write request. Stripe group determiner 263 may have, on first execution, identified and selected a stripe group (using the process described above) that includes 10 stripes with 18 available stripe units. Once the 10 stripes from this stripe group have been allocated to the request, and the appropriate information has been updated in the stripe group mapping table and the tree structure, stripe group determiner 263 may be executed again to find another stripe group that has stripes with 18 available stripe units.

Stripe group determiner 263 may again access the array to identify the tree structure associated with the stripe groups that include stripes with 18 available stripe units. Since the first stripe group no longer has any stripes with 18 available stripe units (since those stripes have already been allocated to the write request), the tree structure no longer includes a reference to that stripe group. Stripe group determiner 263 may use the tree structure to identify a second stripe group that includes 18 available stripe units, and select that group to additionally be used to satisfy the write request. This process can be repeated until the number of stripes usable to satisfy the request have been identified and allocated to the request.

In some implementations, the stripes with the target number of available stripe units collectively include fewer than the total number of available stripe units to satisfy the request. For example, 20 stripes with 18 available stripe units may have been identified to satisfy the request and the entire storage array (across all of the stripe groups) may only include 10 stripes with 18 available stripe units at the time the write request is received. In this instance, stripe identifier 262 may then select a new target number of available stripe units to satisfy the remainder of the write request, where the new target number is less than the original target number.

For example, if 20 stripes with 18 available stripe units were identified to satisfy the request, and only 10 stripes were available and selected (leaving no stripes with 18 available stripe units), stripe identifier 262 may set the new target number of available stripe units to 17. Stripe identifier 262 may then recalculate the number of stripes to satisfy the request using the new target number. Since 10 stripes with 18 available stripe units were allocated (for a total of 180 stripe units), stripe identifier 262 may determine that 180 stripe units are still needed, and using the new target number of 17 for a single stripe, further determine that 11 additional stripes with 17 available stripe units will satisfy the balance of the request.

Stripe identifier 262 may invoke stripe group determiner 263 again to repeat the above process to determine a stripe group that includes at least one stripe with the new target number of available stripe units. In one embodiment, where stripe group determiner 263 has already selected stripes from a stripe group with the first target number, stripe group determiner 263 may select stripes with the new target number of available stripe units from the same stripe group. For example, if stripe group determiner 263 has already selected stripes with 18 available stripe units from a stripe group, it may then select stripes with 17 available stripe units from that same stripe group (if that stripe group has any stripes with 17 available stripe units).

Alternatively, stripe group determiner 263 may start the process from the beginning by identifying the array entry that corresponds to the new target number, accessing the tree structure for the set of stripe groups that include stripes with the new target number of available stripe units, select a stripe group from that set, then select stripes from the selected stripe group. For example, if stripe group determiner 263 has already selected stripes with 18 available stripe units from a stripe group, it may then start the process over by accessing the array entry that corresponds to 17 available stripe units, access the corresponding tree structure, select a stripe group in the tree structure that includes stripes with 17 available stripe units (either by selecting the stripe group with the largest number of stripes with 17 available stripe units, or by selecting the stripe group with the closest number of stripes to the number needed to satisfy the request), and select the stripes from that stripe group.

In some embodiments, stripe identifier 262 may set the target number of available stripe units to be the maximum available for any stripe in the array. For example, if there are any stripes with 18 available stripe units, identify those stripes first, then set the target to 17 and identify those stripes, and so on until the number of total stripe units to satisfy the request has been identified, selected, and allocated. Thus the process can be configured to always search for the stripes that have the greatest number of available stripe units.

Alternatively, stripe identifier 262 may start the process by setting the target number of available stripe units to be the maximum available, and continue using this method until the number of stripe units to satisfy the balance of the request is less than the maximum available. At that point, stripe identifier 262 may then set the target number to the number of available stripe units to satisfy the request. For example, stripe identifier 262 may first identify the stripes in the array that have 18 available stripe units, select those stripes and allocate them to the write request. Stripe identifier 262 may then determine that only 7 additional stripe units are needed to satisfy the balance of the write request. Rather than identify stripes with 17 available stripe units (the next lowest target number after 18), stripe identifier 262 may set the new target number to 7 and identify stripes with that number of available stripe units. Thus, the "best fit" stripes can be obtained for the entire write request.

Once the stripes sufficient to satisfy the write request have been identified and selected, stripe allocator 264 may be invoked to allocate the available stripe units for those stripes to the write request. Stripe allocator 264 may pass this information to write module 258 so that the appropriate addressing information is used when generating write commands 272 to write the data to the storage array, and store the data in the available stripe units of the selected stripes.

Subsequently, stripe parity module 265 may be invoked to compute the parity values for each of the stripes allocated to the write request and store the parity values for those stripes for later use. Since the above process identifies the "best fit" stripes for the request, reducing the total number of stripes to which data is written, stripe parity module 265 may be executed far less frequently, reducing the overhead used to support data recovery, and thus improving overall performance of the storage array.

Figure 3:
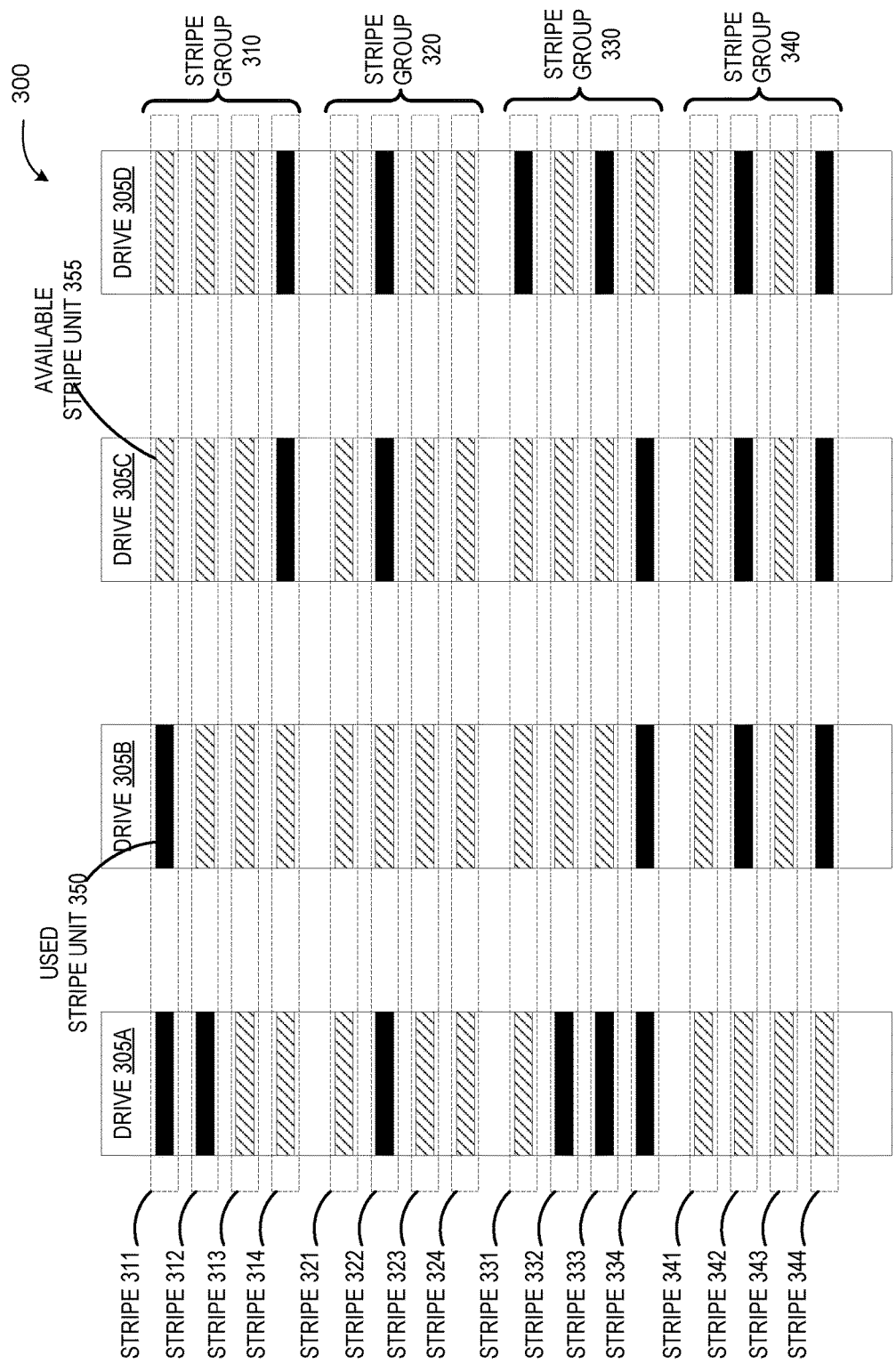
FIG. 3 is a block diagram illustrating one simplified example storage array that includes data stripes divided into stripe groups.

FIG. 3 is a block diagram illustrating one simplified example storage array 300 that includes data stripes divided into stripe groups. In one embodiment, storage array 300 corresponds to drives 150A-Z of FIG. 1.

As shown in FIG. 3, storage array 300 includes four drives 305A-D. Each of drives 305A-D includes 16 total stripe units. Storage array 300 is configured with 16 total stripes that are divided into four total stripe groups. Stripe group 310 includes stripes 311, 312, 313, and 314. Stripe group 320 includes stripes 321, 322, 323, and 324. Stripe group 330 includes stripes 331, 332, 333, and 334. Stripe group 340 includes stripes 341, 342, 343, and 344.

Stripe units in storage array 300 that are being used (e.g., include valid data that cannot be overwritten) are depicted as dark blocks such as that of used stripe unit 350. Available stripe units (e.g., those that may be used for new write requests) are depicted as hashed blocks such as that of available stripe unit 335. As shown in FIG. 3, stripe group 310 includes one stripe with four available stripe units, one stripe with three available stripe units, and two stripes with two available stripe units. Stripe group 320 includes three stripes with four available stripe units, and one stripe with one available stripe unit. Stripe 330 includes two stripes with three available stripe units, one stripe with two available stripe units, and one stripe with one available stripe units. Stripe group 340 includes two stripes with four available stripe units, and two stripes with two available stripe units.

Although for simplicity, FIG. 3 depicts a particular configuration of a storage array, it should be noted that embodiments described herein can operate on other storage array configurations that include more or fewer drives, more or fewer stripes, more or fewer stripe units in a stripe, more or fewer stripe groups, and/or more or fewer stripes in each stripe group.

Figure 4:
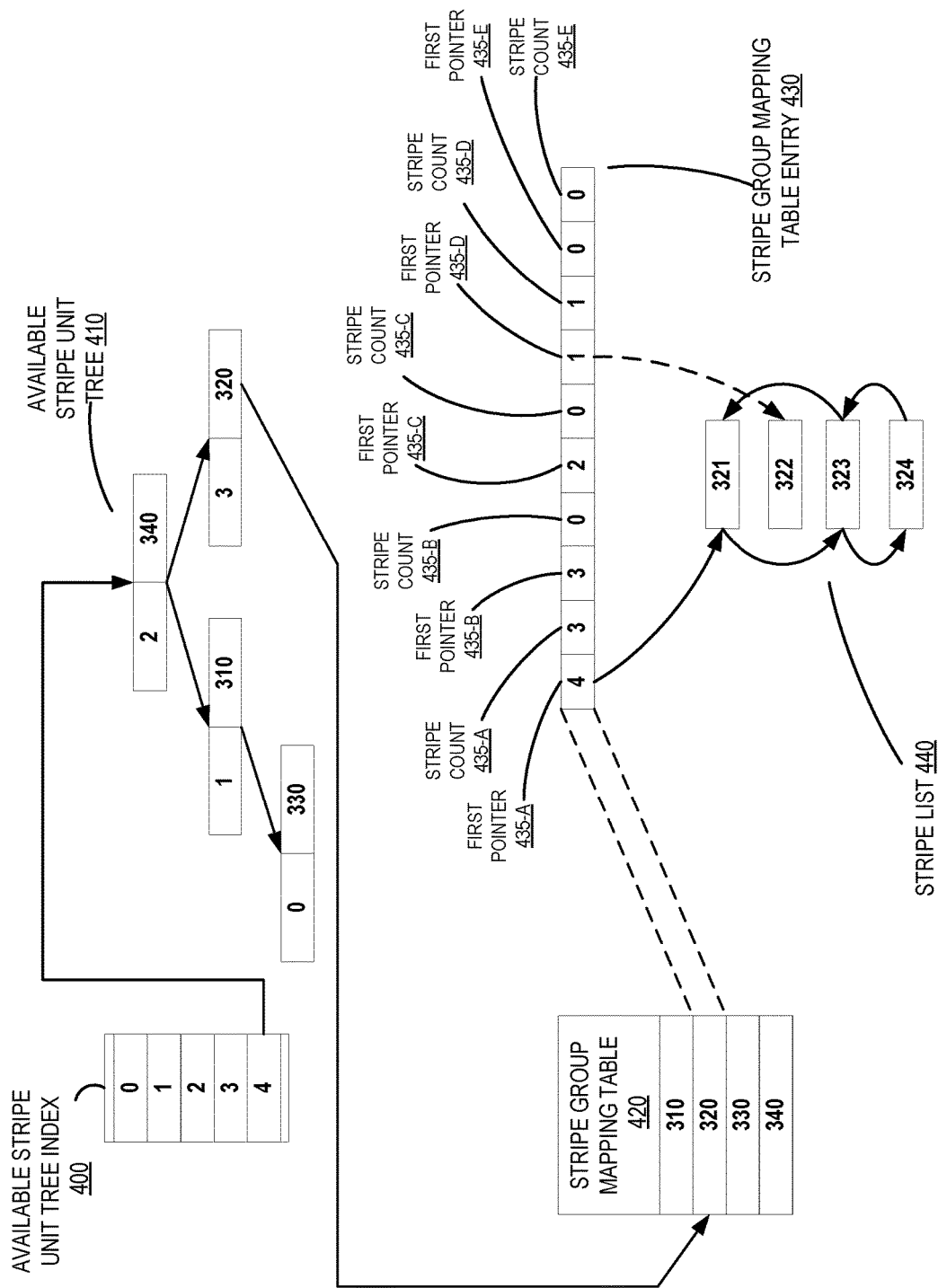
FIG. 4 is a block diagram illustrating one embodiment of data structures used for managing available stripe units for the storage array of FIG. 3.

FIG. 4 is a block diagram illustrating one embodiment of data structures used for managing available stripe units for the storage array of FIG. 3. The data structures depicted in FIG. 4 may be used as described above with respect to spread space tracking module 109A-Y of FIG. 1 and spread space tracking module 260 of FIG. 2.

As shown in FIG. 4, when a request is received to write data to storage array 300 of FIG. 3, the spread space tracking module of an I/O controller in the storage server may identify the stripes in the array that have available stripe units to satisfy the request. In one embodiment, the spread space tracking module may set the target number of available stripe units to four, since four is the largest number of available stripe units that may be present in any single stripe in storage array 300 of FIG. 3.

The spread space tracking module may then access the entry in available stripe unit tree index 400 that corresponds to four available stripe units. As noted above, the available stripe unit tree index 400 may be an array of entries. In other embodiments, available stripe unit tree index 400 may be another type of data structure. Available stripe unit tree index 400 may include information that references the root nodes of tree structures that store information for the stripe groups that include stripes with the corresponding number of available stripe units. As shown in FIG. 4, entry "4" in available stripe unit tree index 400 references the root node of available stripe unit tree 410.

Available stripe unit tree 410 may be configured as a balanced tree structure where each entry corresponds to a stripe group that includes stripes with the target number of available stripe units, and indexed by the number of stripes in that stripe group that include the target number of available stripes. As shown in FIG. 4, available stripe unit tree 410 includes entries for stripe groups 310 (1 stripe with 4 available stripe units), 320 (3 stripes with 4 available stripe units), 330 (0 stripes with 4 available stripe units), and 340 (2 stripes with 4 available stripe units). Although a balanced tree is depicted, in other embodiments other types of tree structures may be used.

The spread space tracking module may identify the root node for available stripe unit tree 410 (e.g., the entry for stripe group 340) and traverse the tree to identify the stripe group with the "best fit" number of stripes with 4 available stripe units. In some implementations, the spread space tracking module may select the entry where the number of stripes is closest to the number sufficient to satisfy the request. Alternatively, as shown in FIG. 4, the spread space tracking module may traverse available stripe unit tree 410 to identify the stripe group with the largest number of stripes with 4 available stripe units in comparison to the other stripe groups in the array. In this case, as shown in FIG. 4, stripe group 320 may be selected since it has the largest number of stripes (3 total) with 4 available stripe units.

Once the spread space tracking module has selected stripe group 320, it may then access stripe group mapping table 420 to obtain the stripe group mapping table entry 430 that corresponds to stripe group 320. In embodiments, stripe group mapping table 420 may include entries for each stripe group in the storage array. Since storage array 300 of FIG. 3 includes four stripe groups, stripe group mapping table 420 depicts four entries, one for each of the four stripe groups.

Stripe group mapping table entry 430 includes reference information and counts for each number of available stripe units that may be present in any one stripe. Thus, since the stripes in storage array 300 of FIG. 3 have a total number of four stripe units each, at any one time, a stripe may have 4 available stripe units, 3 available stripe units, 2 available stripe units, 1 available stripe units, or 0 available stripe units. Accordingly, each entry in stripe group mapping table 430 may include reference information for the stripes that include each of those numbers of available stripe units as well as the total count of stripes that include those numbers.

As shown in FIG. 4, stripe group mapping table entry 430 for stripe group 320 includes first pointer 435-A that stores reference information for the list of stripes with 4 available stripe units and stripe count 435-A that stores the total number of stripes in stripe group 320 with 4 available stripe units (3 total). First pointer 435-B stores reference information for the list of stripes in stripe group 320 with 3 available stripe units and stripe count 435-B stores the total number of stripes in stripe group 320 with 3 available stripe units (0 total). First pointer 435-C stores reference information for the list of stripes in stripe group 320 with 2 available stripe units and stripe count 435-C stores the total number of stripes in stripe group 320 with 2 available stripe units (0 total). First pointer 435-D stores reference information for the list of stripes in stripe group 320 with 1 available stripe unit and stripe count 435-D stores the total number of stripes in stripe group 320 with 1 available stripe unit (1 total). First pointer 435-E stores reference information for the list of stripes in stripe group 320 with 0 available stripe units and stripe count 435-E stores the total number of stripes in stripe group 320 with 0 available stripe units (0 total).

The spread space tracking module may access first pointer 435-A that includes the reference to the first stripe in the list of stripes in stripe group 320 (stripe list 440) that include 4 available stripe units. As shown in FIG. 4, first pointer 435-A points to stripe 321 of storage array 300 (the first stripe in stripe list 440 with 4 available stripe units). As described above, stripe list 440 may be a doubly linked list where each entry in the list includes references to the previous entry in the list as well as the next entry in the list. As shown in FIG. 4, the previous and next entries may be used to chain the entries in stripe list 440 by the number of available stripe units. Thus, since stripes 321, 323, and 324 each include 4 available stripe units, the entries for these stripes are chained using the previous and next pointers accordingly. As shown in FIG. 4, the next pointer in the entry for stripe 321 refers to stripe 323, and the next pointer in the entry for stripe 323 refers to stripe 324. Additionally, the previous pointer in the entry for stripe 324 refers to stripe 323, and the previous pointer in the entry for stripe 323 refers to stripe 321. Similarly, first pointer 435-D refers to the first stripe in stripe list 440 that includes 1 available stripe unit (stripe 322). Since stripe 322 is the only stripe in stripe group 320 that include 1 available stripe unit, the previous and next pointers are null.

The spread space tracking module may select one or more of the stripes in stripe list 440 that include 4 available stripe units in order to satisfy the write request. Once selected, the spread space tracking module may remove the information for that stripe from the stripe group mapping entry and update the counts and pointers accordingly. For example, if the spread space tracking module will use just a single stripe with 4 available stripe units, it may use the information in first pointer 435-A to identify stripe 321. Stripe 321 may be "popped" or removed from the top of the linked list associated with 4 available stripe units and allocated to the write request. The spread space tracking module may then update the first pointer 435-A to refer to the next stripe in the list that includes 4 available stripe units (stripe 323) and decrement the count in stripe count 435-A from 3 to 2. Additionally, since stripe 321 will be entirely allocated to the write request, it will subsequently have 0 available stripe units. Thus, the spread space tracking module may update first pointer 435-E to refer to stripe 321 and increment stripe count 435-E from 0 to 1. Further, since stripe group 320 will now have only 2 stripes with 4 available stripe units, the spread space tracking module can update the entry for stripe group 320 in available stripe unit tree 410 so that the total count is decremented from 3 to 2.

FIGS. 5-8 are flow diagrams of various implementations of methods related to providing data stripe tracking for storage arrays. The methods are performed by processing logic that may include hardware (circuitry, dedicated logic, etc.), software (such as is run on a general purpose computer system or a dedicated machine), or a combination of both. Some methods may be performed by a spread space tracking module such as spread space tracking modules 109A-Y of FIG. 1, and spread space tracking module 260 of FIG. 2. Some methods may be performed by an I/O controller such as any I/O controller 108A-Y of FIG. 1, or I/O controller 250 of FIG. 2.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

Figure 5:
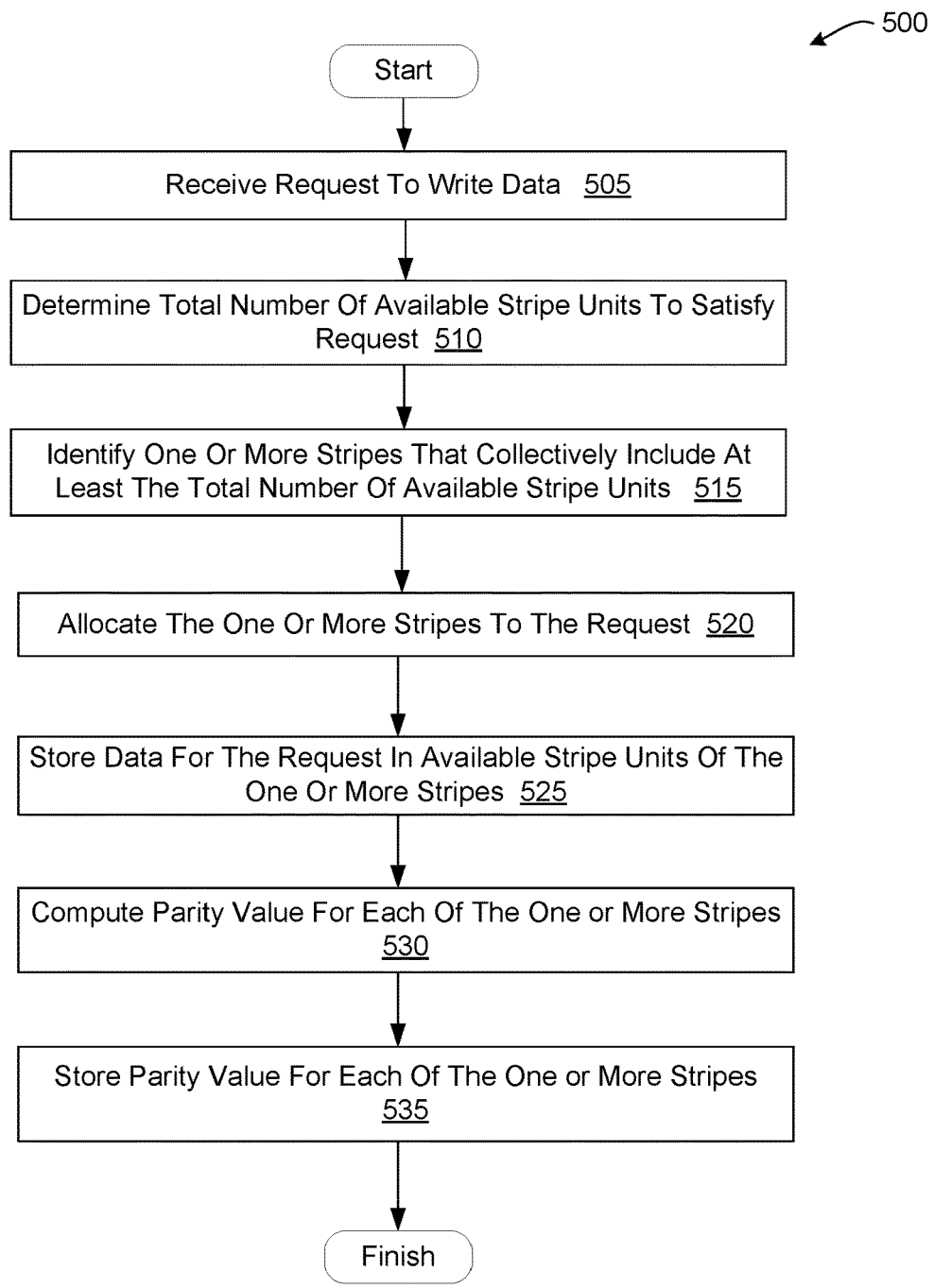
FIG. 5 is a flow diagram of one embodiment for a method of data stripe tracking for storage arrays.

FIG. 5 is a flow diagram of one embodiment for a method 500 of data stripe tracking for storage arrays. At block 505 of method 500, processing logic receives a request to write data to a first logical address of a virtual storage device that is mapped to a plurality of physical storage devices arranged in an array including a plurality of stripes. At block 510, processing logic determines a total number of available strip units to satisfy the request received at block 505. In some embodiments, processing logic may determine the total number by first determining a stripe unit size for the plurality of physical storage devices, then by dividing the amount of data to be written for the write request by the stripe unit size. At block 515, processing logic identifies one or more stripes that collectively include at least the total number of available stripe units determined at block 510. In an illustrative example, processing logic may identify the one or more stripes as described below with respect to FIG. 6.

At block 520, processing logic allocates the one or more stripes identified at block 515 to the request. At block 525, processing logic stores the data for the request in the available stripe units of the one or more stripes identified at block 515. At block 530, processing logic computes a parity value for each of the one or more stripes identified at block 515. At block 535, processing logic stores the parity value computed at block 515 for each of the one or more stripes in one or more physical storage devices in the array. After block 535, the method of FIG. 5 terminates.

Figure 6:
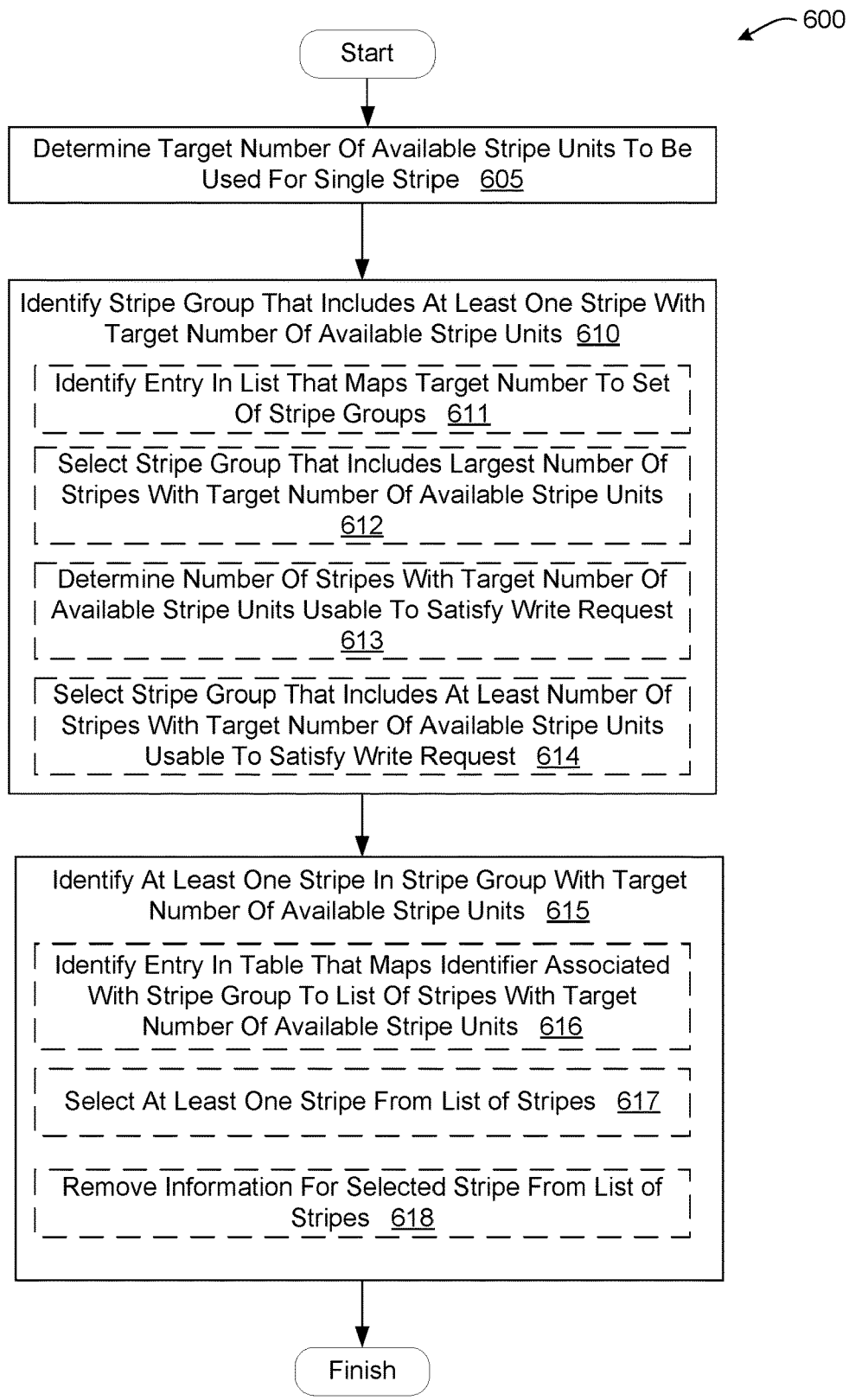
FIG. 6 is a flow diagram of one embodiment for a method of identifying stripes that collectively include a total number of stripe units to satisfy a write request.

FIG. 6 is a flow diagram of one embodiment for a method 600 of identifying stripes that collectively include a total number of stripe units to satisfy a write request. At block 605 of method 600, processing logic determines a target number of available stripe units to be used for a single stripe. In some implementations, the target number is a maximum number of available stripe units for a single stripe.

At block 610, processing logic identifies a stripe group that includes at least one stripe with the target number of available stripe units. In some implementations, processing logic may identify the stripe group by first invoking block 611 to identify an entry in a list that maps the target number of available stripe units to a set of stripe groups that each include one or more stripes with the target number of available stripe units. In embodiment, processing logic may then invoke block 612 to select a stripe group from the set of stripe groups that includes a largest number of stripes with the target number of available stripe units in comparison to other stripe groups in the set of stripe groups.

In another embodiment, processing logic may skip block 612 and instead invoke blocks 613 and 614. At block 613 processing logic determines a number of stripes with the target number of available stripe units sufficient to satisfy the request. At block 614, processing logic selects a stripe group from the set of stripe group that includes at least the number of stripes with the target number of available stripe units.

At block 615, processing logic identifies at least one stripe in the stripe group identified at block 610 with the target number of available stripe units. In one embodiment, block 616 is invoked to identify an entry in a table that maps an identifier associated with a stripe group identified at block 610 to a list of stripes in that stripe group with the target number of available stripe units. Block 617 may then be invoked to select at least one stripe from the list of stripes in the identified stripe group. Block 618 may then be invoked to remove information for the selected stripe from the list of stripes. After block 615 (or 618), the method of FIG. 6 terminates.

Figure 7:
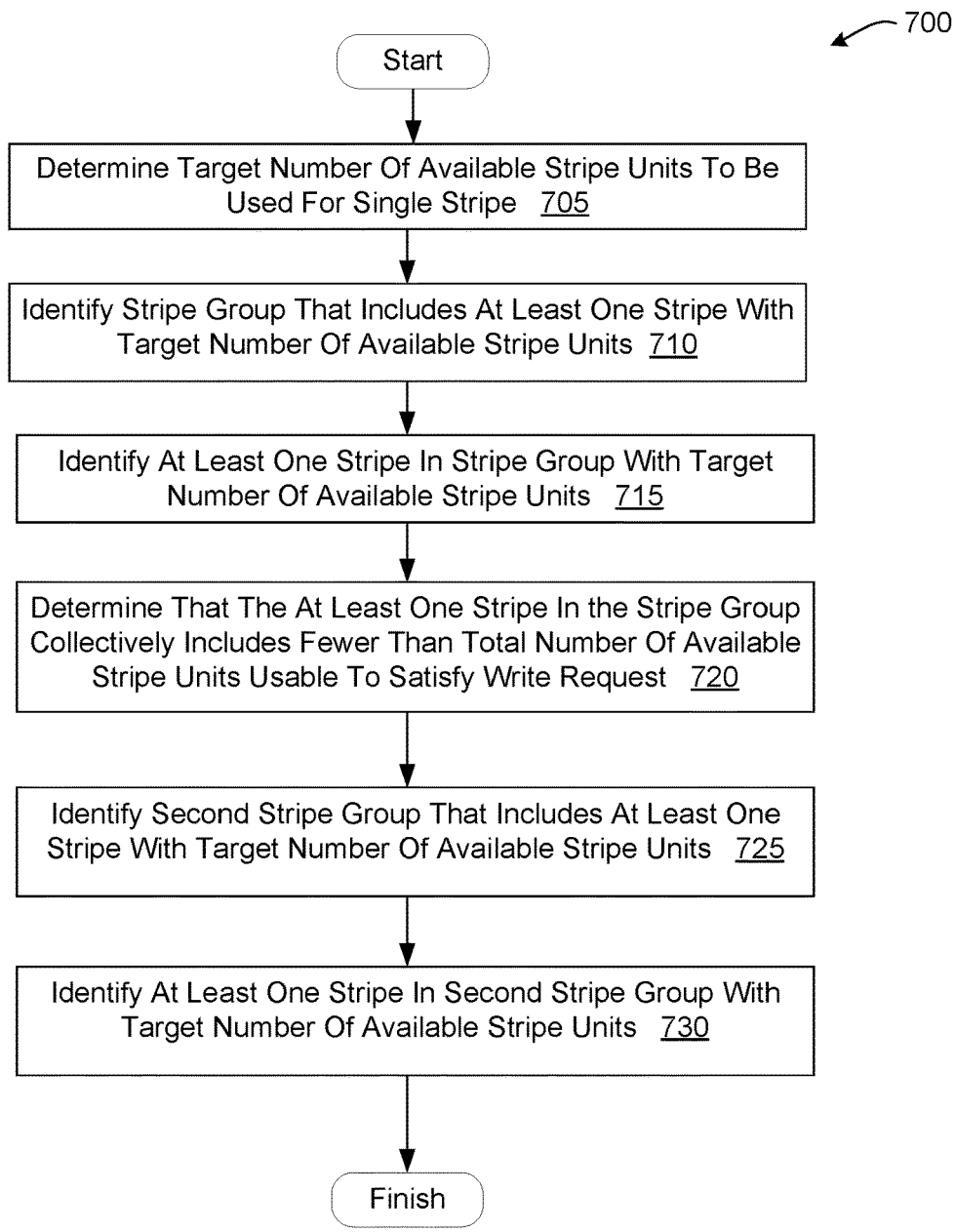
FIG. 7 is a flow diagram of one embodiment for a method of identifying additional stripes to satisfy a write request.

FIG. 7 is a flow diagram of one embodiment for a method 700 of identifying additional stripes to satisfy a write request. At block 705 of method 700, processing logic determines a target number of available stripe units to be used for a single stripe. At block 710, processing logic identifies a stripe group that includes at least one stripe with the target number of available stripe units. At block 715, processing logic identifies at least one stripe in the stripe group identified at block 710 with the target number of available stripe units. At block 720, processing logic determines that the at least one stripe in the stripe group collectively includes fewer than the total number of available stripe units that will satisfy the write request. At block 725, processing logic identifies a second stripe group that includes at least one stripe with the target number of available stripe units. At block 730, processing logic identifies at least one stripe in the second stripe group with the target number of available stripe units. After block 730, the method of FIG. 7 terminates.

Figure 8:
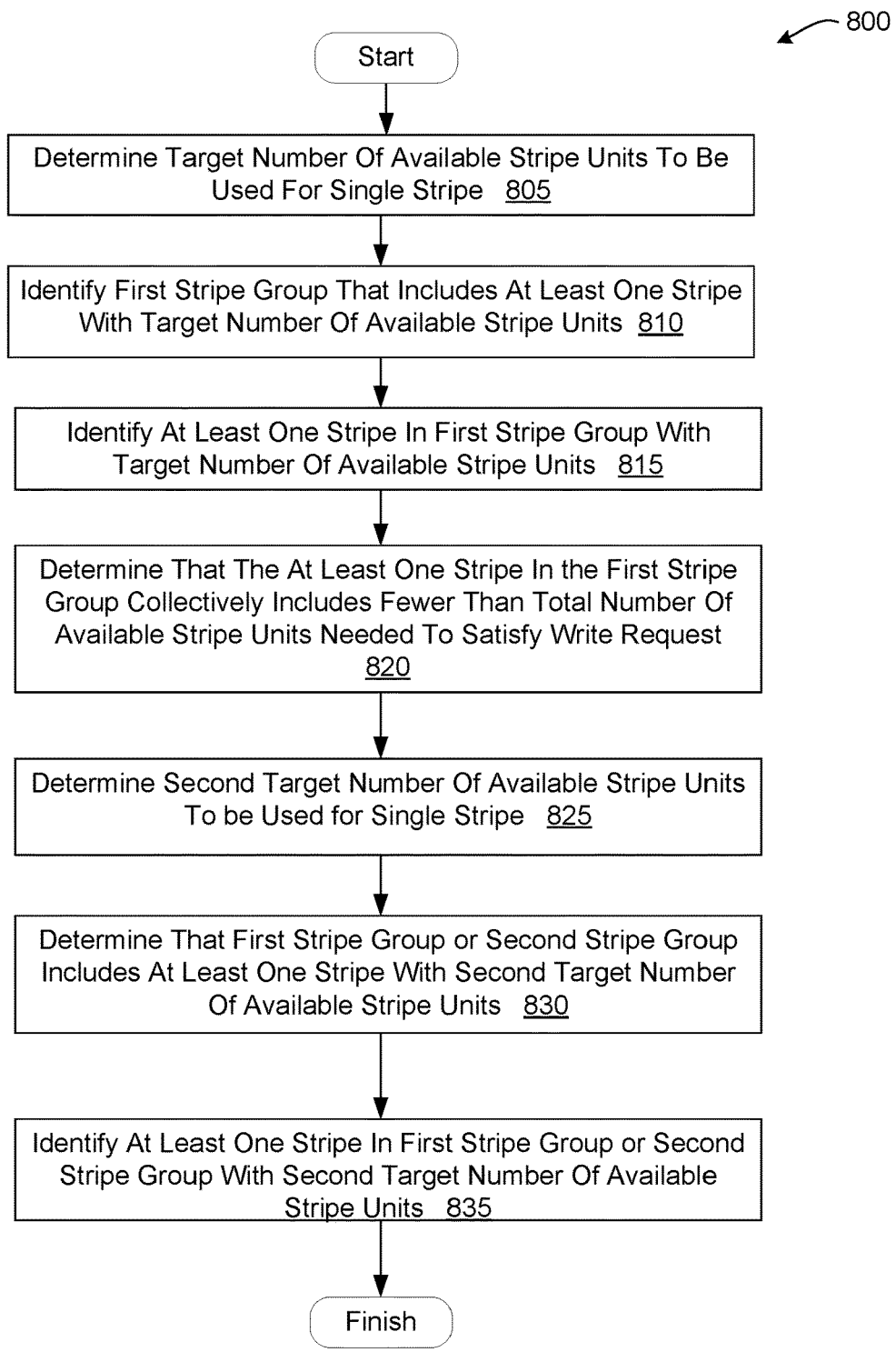
FIG. 8 is a flow diagram of another embodiment for a method of identifying additional stripes to satisfy a write request.

FIG. 8 is a flow diagram of another embodiment for a method 800 of identifying additional stripes to satisfy a write request. At block 805 of method 800, processing logic determines a target number of available stripe units to be used for a single stripe. At block 810, processing logic identifies a first stripe group that includes at least one stripe with the target number of available stripe units. At block 815, processing logic identifies at least one stripe in the stripe group identified at block 810 with the target number of available stripe units. At block 820, processing logic determines that the at least one stripe in the first stripe group includes fewer than the total number of available stripe units sufficient to satisfy a write request.

At block 825, processing logic determines second target number of available stripe units to be used for a single stripe, where the second target number is less than the first target number. At block 830, processing logic determines that the first stripe group or a second strip group includes at least one stripe with the second target number of available stripe units. At block 835, processing logic identifies at least one stripe in the first stripe group or the second stripe group with the second target number of available stripe units. After block 835, the method of FIG. 8 terminates.

Figure 9:
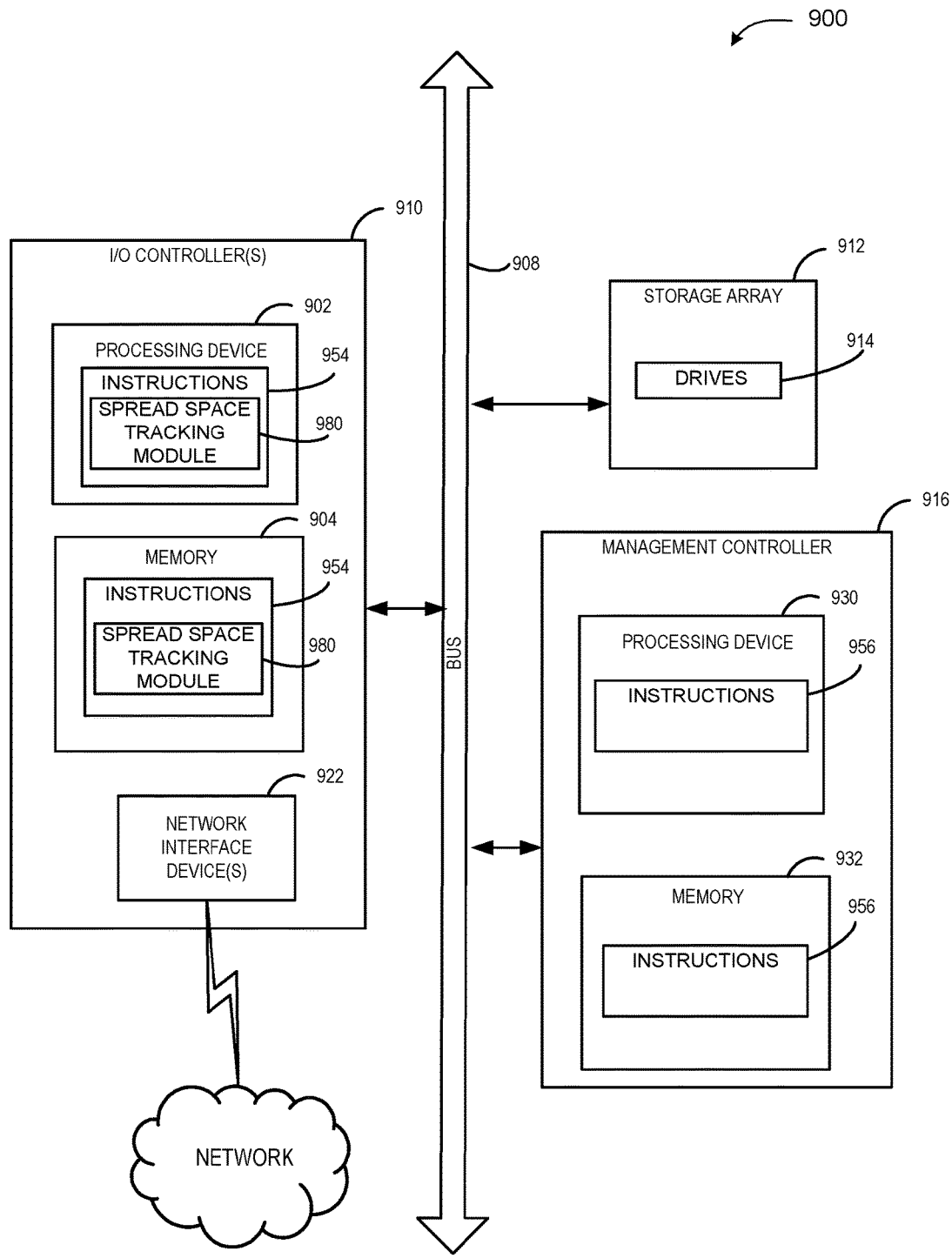
FIG. 9 illustrates an example computing device, in accordance with one embodiment.

FIG. 9 illustrates a diagrammatic representation of a machine in the example form of a computing device 900 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a hardware storage server, and may provide storage to hosts using one or more of a storage area network (SAN) or network attached storage (NAS) methodology. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 900 includes one or more I/O controllers 910, a storage array 912, and a management controller 916 (or multiple management controllers 916), which communicate with each other via a bus 908. Bus 908 may include one or more switches (e.g., switch 110 of FIG. 1) and one or more storage fabrics (also referred to as backplane fabrics). Each storage fabric includes hardware (e.g., switches, etc.) that connects I/O controllers 710 to drives 914. Each storage fabric may include a fabric board (e.g., a printed circuit board (PCB) that includes multiple hardware components). Alternately, multiple storage fabrics may be part of a single backplane printed circuit board (PCB). Each storage fabric enables any I/O controller 910 to connect to any drive 914. Each storage fabric may be independent of other storage fabrics, using its own hardware, ports, connections, etc. that are distinct from those used by the other storage fabrics. Accordingly, if any component in a storage fabric fails and causes that storage fabric to fail, the I/O controllers 910 may continue to maintain connections to the drives 914 via an alternative storage fabric.

Each I/O controller 910 represents a device configured to connect one or more host computing devices to one or more drives (e.g., I/O controller 108A-Y of FIG. 1). An I/O controller 910 includes a processing device 902, and a memory 904 (e.g., read-only memory (ROM), flash memory, dynamic random access memory (DRAM) such as synchronous DRAM (SDRAM) or Rambus DRAM (RDRAM), etc.). The I/O controller 910 may further include one or more network interface devices 922 to connect to a network. In one embodiment, each I/O controller 910 is a system on a chip (SoC) including processing device 902, memory 904, and one or more network interface devices 922.

Management controller 916 represents a device configured to manage a storage fabric. The management controller 916 may be configured to perform particular operations with regards to management of the array of drives 914 in storage array 912. Management controller 916 may include a memory 932 having instructions 956 and a processing device 930 that loads and executes those instructions 956. Memory 932 may be read-only memory (ROM), flash memory, dynamic random access memory (DRAM) such as synchronous DRAM (SDRAM) or Rambus DRAM (RDRAM), etc. In one embodiment, management controller 916 is a system on a chip (SoC) including processing device 730 and memory 932.

Processing device 902 and/or processing device 930 represents one or more general-purpose processors such as a microprocessor, central processing unit, or the like. More particularly, the processing device 902, 930 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 902, 930 may also be one or more special-purpose processing devices such as an application specific integrated circuit (ASIC), a field programmable gate array (FPGA), a digital signal processor (DSP), network processor, or the like. Processing device 902, 930 is configured to execute processing logic (e.g., instructions 954, 956) for performing operations discussed herein.

The memory 904, 932 may be a machine-readable storage medium (or more specifically a computer-readable storage medium) on which is stored one or more sets of instructions 954, 956 embodying any one or more of the methodologies or functions described herein. The instructions 954, 956 may also reside, completely or at least partially, within the processing device 902, 930 during execution thereof by the I/O controller 910 (or management controller 916), the processing device 902, 930 also constituting computer-readable storage media. Alternatively, or additionally, the instructions 954, 956 may be resident on drive 914 (e.g., a solid state storage drive and/or a hard disk drive) connected to bus 908.

The instructions 954 may include a spread space tracking module 980 (e.g., as described above with respect to FIGS. 1-2), and/or a software library containing methods that call a spread space tracking module 980. In some embodiments instructions 956 may also include a spread space tracking module 980. While the computer-readable storage medium is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing or encoding a set of instructions for execution by the machine and that cause the machine to perform any one or more of the methodologies described herein. The term "computer-readable storage medium" shall accordingly be taken to include, but not be limited to, solid-state memories, and optical and magnetic media.

The storage array 912 represents a group of drives 914 and/or a device that contains the group of drives 914. Storage array 912 may arrange drives 914 into logical redundant storage containers, or a redundant array of independent disks (RAID). The storage array 912 may distribute data across the drives 914 in one of several RAID levels to provide different levels of redundancy and performance. In some implementations, storage array 912 may include one group of drives 914 for data and another group of drives 914 for recovery purposes. Drives 914 may be physical storage devices such as solid state drives (SSDs) (e.g., SAS/SATA drives, non-volatile memory express (NVMe) drives, small computer system interface (SCSI) over PCIe (SOP) drives, or solid state drives that communicate using different protocols), conventional disk drives, or any other storage media. The number of drives 914 included in storage array 912 may be less than 10 to more than 100. The drives 914 may have the same or different storage capacities.

The modules, components and other features described herein (for example in relation to FIG. 2) can be implemented as discrete hardware components or integrated in the functionality of hardware components such as ASICS, FPGAs, DSPs, SoCs or similar devices. In addition, the modules can be implemented as firmware or functional circuitry within hardware devices. Further, the modules can be implemented in any combination of hardware devices and software components, or only in software.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "determining", "identifying", "allocating", "storing", or the like, refer to the actions and processes of a processing device or processing logic that manipulates and transforms data represented as physical (e.g., electronic) quantities within registers and memories into other data similarly represented as physical quantities within the memories or registers or other such information storage devices.

Embodiments of the invention also relate to an apparatus for performing the operations herein. This apparatus may be specially constructed for the required purposes, or it may comprise a general purpose computer selectively activated or reconfigured by a computer program or firmware stored in the computer. Such a computer program or firmware may be stored in a computer readable storage medium, such as, but not limited to, any type of disk including optical disks, CD-ROMs, and magnetic-optical disks, read-only memories (ROMs), random access memories (RAMs), electrically programmable read only memories (EPROMs), electrically erasable programmable read only memories (EEPROMs), magnetic or optical cards, or any type of media suitable for storing electronic instructions. The term "computer-readable storage medium" shall also be taken to include any medium other than a carrier wave that is capable of storing or encoding a set of instructions for execution by the computing device that cause the computing device to perform any one or more of the methodologies of the present invention.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving, by a processing device of a storage server that manages a plurality of physical storage devices arranged in a plurality of stripes, a request to write data to a virtual storage device that is mapped to the plurality of physical storage devices;
   determining, by the processing device, a total number of available stripe units needed to satisfy the request;
   identifying, by the processing device, one or more stripes of the plurality of stripes that collectively include at least the total number of available stripe units, wherein identifying the one or more stripes comprises:
      determining a first number of available stripe units to be used for a single stripe;
      identifying a first stripe group that includes at least one stripe with the first number of available stripe units; and
      identifying the at least one stripe in the first stripe group with the first number of available stripe units;
   allocating the one or more stripes to the request; and
   storing the data for the request in the available stripe units of the one or more stripes.

2. The method of claim 1, wherein determining the total number of available stripe units needed to satisfy the request comprises:
   determining a stripe unit size for the plurality of physical storage devices; and
   dividing an amount of the data by the stripe unit size.

3. The method of claim 1, wherein identifying the first stripe group comprises:
   identifying an entry in a list that maps the first number of available stripe units to a set of stripe groups that each include one or more stripes with the first number of available stripe units; and
   selecting, from the set of stripe groups, a stripe group that includes a largest number of stripes with the first number of available stripe units in comparison to other stripe groups in the set of stripe groups.

4. The method of claim 1, wherein identifying the first stripe group comprises:

identifying an entry in a list that maps the first number of available stripe units to a set of stripe groups that each include one or more stripes with the first number of available stripe units;

determining a number of stripes with the first number of available stripe units needed to satisfy the request; and selecting a stripe group from the set of stripe groups that includes at least the number of stripes with the first number of available stripe units.

5. The method of claim 1, wherein identifying the at least one stripe in the first stripe group with the first number of available stripe units comprises:

identifying an entry in a table that maps an identifier associated with the first stripe group to a list of stripes in the first stripe group with the first number of available stripe units;

selecting the at least one stripe from the list of stripes in the first stripe group; and removing information for the selected at least one stripe from the list of stripes.

6. The method of claim 1, further comprising:

determining that the at least one stripe in the first stripe group collectively includes fewer than the total number of available stripe units needed to satisfy the request;

identifying a second stripe group that includes at least one stripe with the first number of available stripe units; and identifying at least one stripe in the second stripe group with the first number of available stripe units.

7. The method of claim 1, further comprising:

determining that the at least one stripe in the first stripe group collectively includes fewer than the total number of available stripe units needed to satisfy the request;

determining a second number of available stripe units to be used for a single stripe, the second number being less than the first number;

determining that the first stripe group or a second stripe group includes at least one stripe with the second number of available stripe units; and identifying at least one stripe in the first stripe group or the second strip group with the second number of available stripe units.

8. The method of claim 1, wherein the first number is a maximum number of available stripe units for a single stripe in the plurality of stripes.

9. The method of claim 1, further comprising:

computing a parity value for each of the one or more stripes; and storing the parity value for each of the one or more stripes.

10. The method of claim 1, wherein each stripe of the plurality of stripes comprises a plurality of stripe units, and wherein each stripe unit of the plurality of stripe units for a single stripe of the plurality of stripes is associated with a single physical storage device of the plurality of physical storage devices.

11. A storage server comprising:

a plurality of physical storage devices arranged in a plurality of stripes; and an input/output (I/O) controller coupled to the plurality of physical storage devices via at least one of a switch or a bus, the I/O controller comprising a processing device that is to:

receive a request to write data to a virtual storage device that is mapped to the plurality of physical storage devices;

determine a total number of available stripe units needed to satisfy the request;

identify one or more stripes of the plurality of stripes that collectively include at least the total number of available stripe units, wherein to identify the one or more stripes, the processing device is to:

determine a first number of available stripe units to be used for a single stripe;

identify a first stripe group that includes at least one stripe with the first number of available stripe units; and identify the at least one stripe in the first stripe group with the first number of available stripe units;

allocate the one or more stripes to the request; and store the data for the request in the available stripe units of the one or more stripes.

12. The storage server of claim 11, wherein to determine the total number of available stripe units needed to satisfy the request, the processing device is to:

determine a stripe unit size for the plurality of physical storage devices; and divide an amount of the data by the stripe unit size.

13. The storage server of claim 11, wherein to identify the first stripe group, the processing device is to:

identify an entry in a list that maps the first number of available stripe units to a set of stripe groups that each include one or more stripes with the first number of available stripe units; and select, from the set of stripe groups, a stripe group that includes a largest number of stripes with the first number of available stripe units in comparison to other stripe groups in the set of stripe groups.

14. The storage server of claim 11, wherein to identify the first stripe group, the processing device is to:

identify an entry in a list that maps the first number of available stripe units to a set of stripe groups that each include one or more stripes with the first number of available stripe units;

determine a number of stripes with the first number of available stripe units that satisfy the request; and select a stripe group from the set of stripe groups that includes at least the number of stripes with the first number of available stripe units.

15. The storage server of claim 11, wherein to identify the at least one stripe in the first stripe group with the first number of available stripe units, the processing device is to:

identify an entry in a table that maps an identifier associated with the first stripe group to a list of stripes in the first stripe group with the first number of available stripe units;

select the at least one stripe from the list of stripes in the first stripe group; and remove information for the selected at least one stripe from the list of stripes.

16. The storage server of claim 11, wherein the processing device is further to:

determine that the at least one stripe in the first stripe group collectively includes fewer than the total number of available stripe units needed to satisfy the request;

identify a second stripe group that includes at least one stripe with the first number of available stripe units; and identify at least one stripe in the second stripe group with the first number of available stripe units.

17. The storage server of claim 11, wherein the processing device is further to:

determine that the at least one stripe in the first stripe group collectively includes fewer than the total number of available stripe units needed to satisfy the request;

determine a second number of available stripe units to be used for a single stripe, the second number being less than the first number;

determine that the first stripe group or a second stripe group includes at least one stripe with the second number of available stripe units; and identify at least one stripe in the first stripe group or the second strip group with the second number of available stripe units.

18. The storage server of claim 11, wherein the processing device is further to:

compute a parity value for each of the one or more stripes; and store the parity value for each of the one or more stripes.

19. A non-transitory computer readable storage medium having instructions that, when executed by a processing device of a storage server that manages a plurality of physical storage devices arranged in a plurality of stripes, cause the processing device to perform operations comprising:

receiving, by the processing device, a request to write data to a virtual storage device that is mapped to the plurality of physical storage devices;

determining, by the processing device, a total number of available stripe units needed to satisfy the request;

identifying, by the processing device, one or more stripes of the plurality of stripes that collectively include at least the total number of available stripe units, wherein identifying the one or more stripes comprises:

determining a first number of available stripe units to be used for a single stripe;

identifying a first stripe group that includes at least one stripe with the first number of available stripe units; and identifying the at least one stripe in the first stripe group with the first number of available stripe units;

allocating the one or more stripes to the request; and storing the data for the request in the available stripe units of the one or more stripes.

20. The non-transitory computer readable storage medium of claim 19, the operations further comprising:

computing a parity value for each of the one or more stripes; and storing the parity value for each of the one or more stripes.

21. The non-transitory computer readable storage medium of claim 19, wherein identifying the first stripe group comprises:

identifying an entry in a list that maps the first number of available stripe units to a set of stripe groups that each include one or more stripes with the first number of available stripe units; and selecting, from the set of stripe groups, a stripe group that includes a largest number of stripes with the first number of available stripe units in comparison to other stripe groups in the set of stripe groups.

* * * * *